United States Patent
Naar

(10) Patent No.: US 10,635,716 B2
(45) Date of Patent: Apr. 28, 2020

(54) METHODS AND SYSTEMS FOR SECURED END-TO-END DATA COMMUNICATION

(71) Applicant: FACEBOOK, INC., Menlo Park, CA (US)

(72) Inventor: Dekel Shmuel Naar, Tel Aviv (IL)

(73) Assignee: FACEBOOK, INC., Menlo Park, CA (US)

(*) Notice: Subject to any disclaimer, the term of this patent is extended or adjusted under 35 U.S.C. 154(b) by 184 days.

(21) Appl. No.: 15/246,290

(22) Filed: Aug. 24, 2016

(65) Prior Publication Data

US 2018/0062995 A1   Mar. 1, 2018

(51) Int. Cl.
| | | |
|---|---|---|
| G06F 16/901 | (2019.01) | |
| H04L 12/741 | (2013.01) | |
| H04L 29/06 | (2006.01) | |
| H04L 29/08 | (2006.01) | |
| G06F 16/955 | (2019.01) | |

(52) U.S. Cl.
CPC ........ *G06F 16/9017* (2019.01); *G06F 16/955* (2019.01); *H04L 45/745* (2013.01); *H04L 63/0428* (2013.01); *H04L 63/0823* (2013.01); *H04L 63/166* (2013.01); *H04L 67/2804* (2013.01); *H04L 67/02* (2013.01); *H04L 67/306* (2013.01)

(58) Field of Classification Search
CPC .. H04L 45/745; H04L 67/28; G06F 17/30952
See application file for complete search history.

(56) References Cited

U.S. PATENT DOCUMENTS

| | | | | |
|---|---|---|---|---|
| 8,352,725 | B1* | 1/2013 | O'Toole, Jr. ............ | H04L 63/20 713/151 |
| 2002/0169842 | A1* | 11/2002 | Christensen ........... | G06Q 40/02 709/206 |
| 2005/0021841 | A1* | 1/2005 | Yoshimoto ........ | H04L 29/12066 709/238 |
| 2008/0062997 | A1* | 3/2008 | Nix .................... | H04L 29/12066 370/395.2 |
| 2009/0268715 | A1* | 10/2009 | Jansson ................. | H04M 15/00 370/352 |
| 2012/0011068 | A1* | 1/2012 | Dearing ............... | G06Q 10/083 705/50 |
| 2012/0099433 | A1* | 4/2012 | Willars ............. | H04L 29/12066 370/241 |
| 2016/0285832 | A1* | 9/2016 | Petrov ................. | H04L 63/0428 |
| 2017/0019424 | A1* | 1/2017 | Rodrigues de Moura Leitao ....... H04L 63/08 |

* cited by examiner

*Primary Examiner* — Hoon J Chung
(74) *Attorney, Agent, or Firm* — Morgan, Lewis & Bockius LLP

(57) ABSTRACT

Methods and systems for forwarding data packets by a server system (e.g., a proxy server) are disclosed. The proxy server is coupled to a user device and a plurality of web servers. The proxy server receives a first data packet directed to a first web server of the plurality of web servers from the user device. The first data packet includes a first synthesized address associated with the first web server. The proxy server identifies a first actual address of the first web server. The proxy server replaces the first synthesized address in the first data packet with the first actual address of the first web server. The proxy server further forwards the first data packet to the first web server using the first actual address of the first web server.

13 Claims, 5 Drawing Sheets

METHODS AND SYSTEMS FOR SECURED END-TO-END DATA COMMUNICATION

TECHNICAL FIELD

This relates generally to network communications, including but not limited to providing secured end-to-end data communications between user devices and web servers.

BACKGROUND

Mobile devices have become an increasingly dominant means through which consumers access, download, and consume electronic content over the Internet. Despite substantial advancements in telecommunications technology, however, affordable access to the Internet remains relatively low. Considering the limited affordability of Internet access in certain geographic regions, such as developing countries, consumers often have difficulty accessing the Internet and therefore are often left frustrated when using mobile devices.

Recently, free Internet services have become an increasingly popular option to improve the affordability of Internet access. These free Internet services are called "zero-rated" Internet services. In some systems offering zero-rated services, network carriers may offer access to content through services and products based on different pricing policies. It is beneficial to provide secured data exchange of zero-rated content between the consumers and the web servers.

SUMMARY

Accordingly, there is a need for methods, devices, and systems for improving network operability and for managing secured data exchanged between user devices and web servers. Embodiments set forth herein are directed to methods, devices, and systems for handling secured data exchange by a proxy server. Zero-rated (e.g., free) access to certain content (e.g., zero-rated content) on the Internet may be provided to users at no cost, while non-zero-rated (e.g., paid) access to other content (e.g., non-zero-rated content) on the Internet may also be offered on other terms. By having a proxy server route traffic exchanged between user devices and web servers, the user devices can access the Internet at predetermined rates or at no cost.

In order to allow encrypted communication using Secure Sockets Layer (SSL) protocol between a web browser of a user device and one or more web servers, a proxy server is configured to route encrypted data packets between the web browser of the user device and the one or more web servers without checking the content of the encrypted data packets. By using the methods, devices, and systems discussed in the present disclosure, a synthesized address (e.g., including a synthesized port number) is assigned to each web server of the one or more web servers. A link associated with a respective web server of the one or more web servers is modified to include the corresponding synthesized address assigned to the respective web server. When receiving a first encrypted data packet from a user device directed to the synthesized address of a first web server, the proxy server recognizes the actual address of the first web server using the synthesized address, and replaces the synthesized address with the actual address. The proxy server then forwards the first encrypted data packet to the first web server without checking or decrypting the content of the first encrypted data packet. When receiving a second encrypted data packet from the first web server, the proxy server forwards the second encrypted data packet to the user device without checking the content of the second encrypted data packet. Thus a secured end-to-end data communication tunnel for providing secured zero-rated data exchange can be established between the web browser of the user device and the one or more web servers. This tunnel provides secure end-to-end communications when, for example, web-server content is accessed through a portal, distinct from the web servers, that offers zero-rated access to the web servers. The portal may thus serve as a proxy for multiple zero-rated services.

In accordance with some embodiments, a computer-implemented method is performed at a server system (e.g., a proxy server) with one or more processors and memory storing instructions for execution by the one or more processors. The proxy server is coupled to a user device and a plurality of web servers. The proxy server receives a first data packet directed to a first web server of the plurality of web servers from the user device. The first data packet includes a first synthesized address associated with the first web server. The proxy server identifies a first actual address of the first web server. The proxy server replaces the first synthesized address in the first data packet with the first actual address of the first web server. The proxy server further forwards the first data packet to the first web server using the first actual address of the first web server.

In accordance with some embodiments, an electronic device (e.g., a proxy server) may include one or more processors, memory, and one or more programs; the one or more programs are stored in the memory and configured to be executed by the one or more processors. The one or more programs include instructions for performing the operations of the above server-side method. In accordance with some embodiments, a non-transitory computer-readable storage medium has stored therein instructions that, when executed by the server system, cause the electronic device to perform the operations of the above server-side method.

In accordance with some embodiments, a computer-implemented method is performed at an electronic device (e.g., a user device) with one or more processors and memory storing instructions for execution by the one or more processors. The user device is coupled to a proxy server for zero-rating. The method includes providing a list of service identifiers in association with one or more web servers respectively. The one or more web servers provide zero-rated content items to the user device. Each service identifier from the list of service identifiers is associated with a synthesized address of the corresponding web server. The method also includes receiving a user selection of a first service identifier associated with a first web server from the list of service identifiers. The user device sends a first data packet directed to the first web server to the proxy server. The first data packet includes a first synthesized address of the first web server.

In accordance with some embodiments, an electronic device (e.g., a user device) may include one or more processors, memory, and one or more programs; the one or more programs are stored in the memory and configured to be executed by the one or more processors. The one or more programs include instructions for performing the operations of the above method for an electronic device. In accordance with some embodiments, a non-transitory computer-readable storage medium has stored therein instructions that, when executed by the electronic device, cause the electronic device to perform the operations of the above method for an electronic device.

BRIEF DESCRIPTION OF THE DRAWINGS

For a better understanding of the various described embodiments, reference should be made to the Description

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first data packet could be termed a second data packet, and, similarly, a second data packet could be termed a first data packet, without departing from the scope of the various described embodiments. The first data packet and the second data packet are both data packets, but they are not the same data packet.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Figure 1:
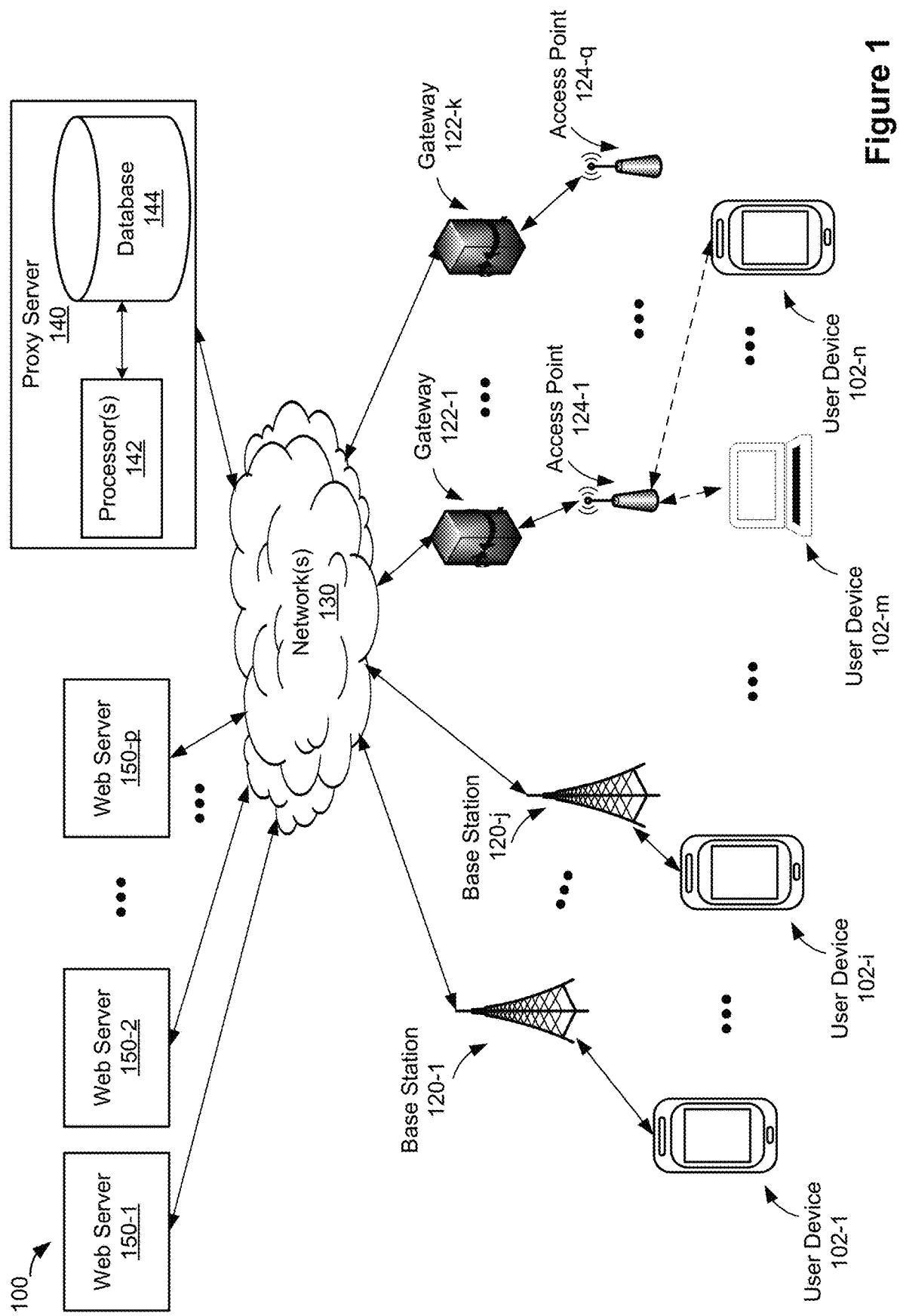
FIG. 1 is a block diagram illustrating a network architecture for providing network services, in accordance with some embodiments.

FIG. 1 illustrates a network architecture 100 in accordance with some embodiments. The network architecture 100 allows mobile carriers (and/or network providers) to provide one or more subscribers (e.g., users) Internet service with one or more pricing policies, e.g., for free (e.g., zero-rated), at special pricing, or at regular pricing. For example, a mobile carrier assigns respective pricing policies to IP addresses or domain names (e.g., domain addresses, host names, host addresses, URLs), web pages, and/or content types (e.g., text, image, audio, and/or video) associated with one or more web servers that provide Internet content to subscribers. The creation of the pricing policies also takes into consideration subscriber account types (e.g., pre-paid, zero-balanced, etc.), subscriber phone numbers, subscriber IP addresses, requested content types, applications running on subscriber devices, and/or other device features.

The network architecture 100 routes the traffic from one or more subscriber devices to destination IP addresses using predetermined pricing policies (e.g., free, special pricing, or regular pricing). The network architecture 100 thus provides various products and/or functionalities (e.g., a Free Basics user interface for zero-rated content) to the subscribers.

In some embodiments, a subscriber device can access one or more predetermined IP addresses or one or more predetermined domain names in accordance with predetermined pricing policies. For example, for a zero-rated service, a subscriber device can download, upload, and/or view a webpage or use an application associated with a predetermined IP address or a predetermined domain name for free, without being charged for network access. Thus, these types of predetermined IP addresses or domain names are called zero-rated. The content from zero-rated web pages and/or applications is called zero-rated content.

In another example, for specially priced services, a network operator may provide promotions, such as discounted pricing, for accessing certain IP addresses or certain domain names, and/or certain content types (e.g., texts and/or images) from certain IP addresses or certain domain names. The specially priced services may be provided to certain subscribers as selected by the network operator.

In yet another example, for regularly priced services, a subscriber device can access one or more IP addresses or one or more domain names that are not zero-rated or are not specially priced by paying regular service fees. In some embodiments, one or more IP addresses or one or more domain names that are neither zero-rated nor specially priced are treated as regularly priced. The IP addresses or domain names that require paid network access are called non-zero-rated content providers, which include regularly priced content providers and specially priced content providers. The content provided by the non-zero-rated content providers is called non-zero-rated content, and includes regularly priced content and/or specially priced content.

The network architecture 100 includes client-side modules (e.g., as discussed with reference to FIG. 2) executed on a number of user devices (also called "client devices," "client systems," "client computers," "subscriber devices," or "clients") 102-1 . . . 102-$i$ . . . 102-$m$ . . . 102-$n$ and server-side modules (e.g., as discussed with reference to FIG. 3) executed on one or more server systems, such as a proxy server 140 and/or one or more web servers 150-1, 150-2 . . . 150-*p*. The user devices 102 communicate with the server systems (e.g., the proxy server 140 and/or the one or more web servers 150) through one or more networks 130 (e.g., the Internet, cellular telephone networks, mobile data networks, other wide area networks, local area networks, metropolitan area networks, and so on). Client-side modules provide client-side functionalities for the network service platform (e.g., Internet service, zero-rated Internet service, special priced Internet service, and regularly priced Internet service) and communications with server-side modules. Server-side modules provide server-side functionalities for the network service platform (e.g., routing network traffic, serving internet content with specific pricing policies, and/or managing user account information) for any number of user devices 102.

In some embodiments, the user devices 102 are mobile devices and/or fixed-location devices. The user devices 102 are associated with subscribers (not shown) who employ the user devices 102 to access one or more IP addresses or domain names (e.g., including zero-rated content providers and/or non-zero-rated content providers). The user devices 102 execute web browser applications and/or other applications that can be used to access the one or more IP addresses or domain names. In some embodiments, a user device 102 processes requests for network services and forwards the requests from the user device 102 to the proxy server 140.

Examples of the user devices 102 include, but are not limited to, feature phones, smart phones, smart watches, personal digital assistants, portable media players, tablet computers, 2D gaming devices, 3D (e.g., virtual reality) gaming devices, laptop computers, desktop computers, televisions with one or more processors embedded therein or coupled thereto, in-vehicle information systems (e.g., an in-car computer system that provides navigation, entertainment, and/or other information), wearable computing devices, personal digital assistants (PDAs), enhanced general packet radio service (EGPRS) mobile phones, media players, navigation devices, game consoles, smart televisions, remote controls, combinations of any two or more of these data processing devices or other data processing devices, and/or other appropriate computing devices that can be used to communicate with the proxy server 140.

In some embodiments, the network architecture 100 includes one or more base stations 120-1 . . . 120-*j* for carrier networks that provide cellular service to the user devices 102. One or more network operators (e.g., network service providers, network carriers, or cellular companies) own or control the one or more base stations 120 and related infrastructure. For example, the base station 120 communicably connects one or more user devices 102 (e.g., 102-1) to one another (e.g., 102-*i*) and/or to the networks 130. In some embodiments, the network architecture 100 includes one or more gateways 122-1 . . . 122-*k* connected to one or more wireless access points 124-1 . . . 124-*q* respectively for providing Wi-Fi networks to the user devices 102 (e.g., 102-*m*, 102-*n*). The base stations 120 and the gateways 122 are responsible for routing traffic between the networks 130 and the user device 102.

In some embodiments, the proxy server 140 is implemented on one or more standalone computers or on a distributed network of computers. In some embodiments, the proxy server 140 also employs various virtual devices and/or services of third party service providers (e.g., cloud computing) to provide the underlying computing resources and/or infrastructure resources of the proxy server 140. The proxy server 140 includes one or more processors 142 and one or more databases 144. The one or more processors 142 process requests for respective network services from the user devices 102, and route or forward requests to corresponding web servers 150 to provide the network services with corresponding pricing policies. In some embodiments, the proxy server 140 is configured to forward or route data between the user devices 102 and the web servers 150 at zero-rating (i.e., for free, at no data charges). The database 144 stores various information, including but not limited to information related to subscribers, information related to network operators, and/or pricing policies.

In some embodiments, the one or more web servers 150-1, 150-2 . . . 150-*p* include social networking servers configured to host various social networking functionalities. In some embodiments, the one or more web servers 150-1, 150-2 . . . 150-*p* include third-party servers configured to provide other types of services. Exemplary third-party services include social networking, book sales, book reviews sharing, business, communication, contests, education, entertainment, fashion, finance, food and drink, games, health and fitness, lifestyle, local information, movies, television, music and audio, news, photos, video, productivity, reference material, security, shopping, sports, travel, utilities, encyclopedia, and the like. In some embodiments, a given web server 150 hosts a website that provides web pages to user devices 102. Alternatively or additionally, a given web server 150 hosts an application that is used by user devices 102. As discussed above, the proxy server 140 may route or redirect requests from user devices 102 to respective web servers 150. In some embodiments, the proxy server 140 uses inline frames ("iframes") to nest independent websites within a web page (e.g., a zero-rated, a regularly priced, or a specially priced web page). In some embodiments, the proxy server 140 uses iframes to enable third-party developers to create applications that are hosted separately by a web server 150 (e.g., a third-party server), but operate within a user session and are accessed through the user's profile in the proxy server 140. In some embodiments, a given web server 150 is used to provide third-party content (e.g., news articles, reviews, message feeds, etc.). In some embodiments, a given web server 150 is a single computing device, while in other embodiments, a given web server 150 is implemented by multiple computing devices working together to perform the actions of a server system (e.g., cloud computing).

In some embodiments, respective IP addresses or respective domain names associated with one or more web servers 150 are predetermined to be zero-rated content providers that are configured to provide zero-rated content to the user devices 102. A user device 102 does not need to pay data usage fees to a network provider for viewing, downloading, and/or uploading data to or from the one or more zero-rated content providers. In some embodiments, respective IP addresses or respective domain names associated with one or more web servers 150 are non-zero-rated content providers (e.g., regularly priced or specially priced) that provide non-zero-rated (e.g., paid) content. A user device 102 pays a data usage fee to a network provider for viewing, downloading, and/or uploading data to or from the one or more non-zero-rated content providers.

Figure 2:
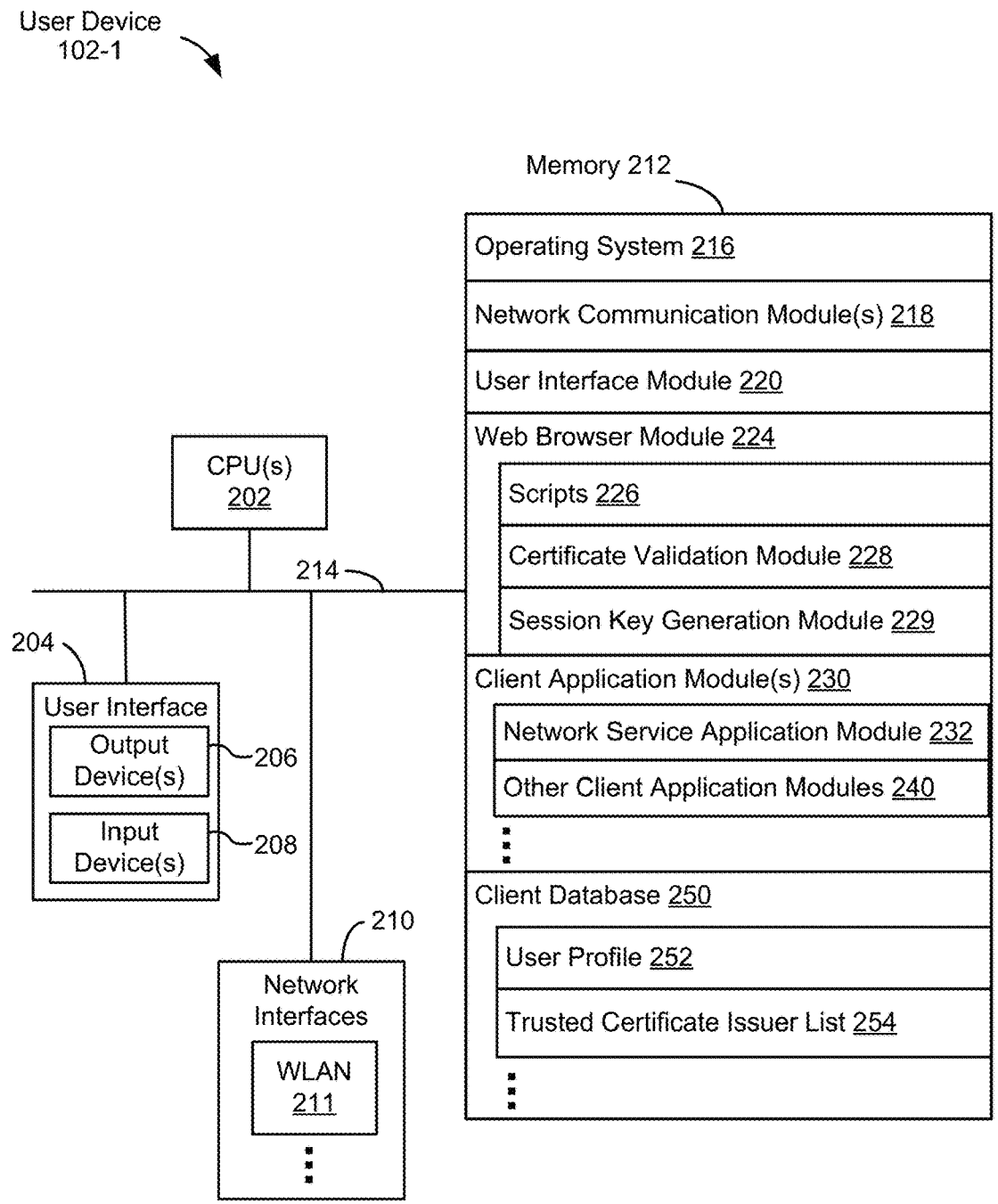
FIG. 2 is a block diagram illustrating a user device, in accordance with some embodiments.

FIG. 2 is a block diagram illustrating an exemplary user device 102 (e.g., one of the user devices 102-1 through 102-*n*, FIG. 1) in accordance with some embodiments. The user device 102 typically includes one or more central processing units (CPU(s)) (e.g., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

The user device 102 includes a user interface 204, including output device(s) 206 and input device(s) 208. In some embodiments, the input devices include a keyboard or a track pad. Alternatively, or in addition, the user interface 204 includes a display device that includes a touch-sensitive surface, in which case the display device is a touch-sensitive display. In user devices that have a touch-sensitive display, a physical keyboard is optional (e.g., a soft keyboard may be displayed when keyboard entry is needed). The output devices 206 also optionally include speakers and/or an audio output connection (i.e., audio jack) connected to speakers, earphones, or headphones. Optionally, the user device 102 includes an audio input device (e.g., a microphone) to capture audio (e.g., speech from a user). Furthermore, some user devices 102 use a microphone and voice recognition software to supplement or replace the keyboard. Optionally, the user device 102 includes a location-detection device, such as a GPS (global positioning satellite) or other geo-location receiver, and/or location-detection software for determining the location of the user device 102.

In some embodiments, the one or more network interfaces 210 include wireless and/or wired interfaces for receiving data from and/or transmitting data to other user devices 102, the proxy server 140, the web servers 150, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, in some embodiments, the one or more network interfaces 210 includes a wireless LAN (WLAN) interface 211 for enabling data communications with other WLAN-compatible devices and/or the proxy server 140 (via the one or more network(s) 130, FIG. 1).

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

an operating system 216 that includes procedures for handling various basic system services and for performing hardware dependent tasks;
network communication module(s) 218 for connecting the user device 102 to other computing devices (e.g., the proxy server 140, the web servers 150, other user devices 102, and/or other devices) via the one or more network interface(s) 210 (wired or wireless);
a user interface module 220 that receives commands and/or inputs from a user via the user interface 204 (e.g., from the input devices 208, which may include keyboards, touch screens, microphones, eye tracking components, three-dimensional gesture tracking components, and the like), and provides user interface objects and other outputs for display on the user interface 204 (e.g., the output devices 206, which may include a display screen, a touchscreen, a speaker, etc.);
a web browser module 224 (e.g., Internet Explorer by Microsoft, Firefox by Mozilla, Safari by Apple, Opera by Opera Software, or Chrome by Google) for accessing, viewing, and interacting with web sites (e.g., zero-rated and/or non-zero rated web sites), which includes:
scripts 226 for the network service platform that is provided by the proxy server 140 (e.g., as embedded in a web page) and executed by the web browser module 224;
certificate validation module 228 for validating one or more electronic certificates associated with one or more web servers 150 respectively, the validating including, but not limited to, checking a certificate root of an electronic certificate against a list of trusted Certificate Authorities (CAs) for issuing electronic certificates to web servers, and checking whether the electronic certificate is unexpired, unrevoked, and whether its common name is valid for the requested web page; and
session key generation module 229 for generating one or more session keys, a respective session key of the one or more sessions keys used for encrypting data transmitted between the user device 102 and a web server secured with SSL; and
one or more client application modules 230, including the following modules (or sets of instructions), or a subset or superset thereof:
a network service application module 232 for providing one or more functionalities related to network services provided by the proxy server 140; and
other optional client application modules 240, such as applications for social networking, word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support; and
client database 250 for storing data associated with the network service platform, including, but is not limited to:
user profile 252 storing a user profile associated with the user of a client device 102 including, but not limited to, user account information, login credentials to the network service platform, payment data (e.g., linked credit card information, app credit or gift card balance, billing address, shipping address, etc.), bookmarked links (including zero-rated and/or non-zero rated), custom parameters (e.g., age, location, hobbies, etc.) of the user, contacts of the user, and identified trends and/or likes/dislikes of the user. For a given user, the user account information may include, for example, the user's name, profile picture, contact information, birth date, sex, marital status, family status, employment, education background, preferences, interests, and/or other demographic information; and trusted certificate issuer list 254 storing one or more trusted certificate issuers (also referred to certificate authority or CA).

Each of the above identified modules and applications correspond to a set of executable instructions for performing one or more functions as described above and/or in the methods described herein (e.g., the computer-implemented methods and other information processing methods described herein). These modules (i.e., sets of instructions) need not be implemented as separate software programs, procedures, or modules, and thus various subsets of these modules are, optionally, combined or otherwise re-arranged in various embodiments.

Figure 3:
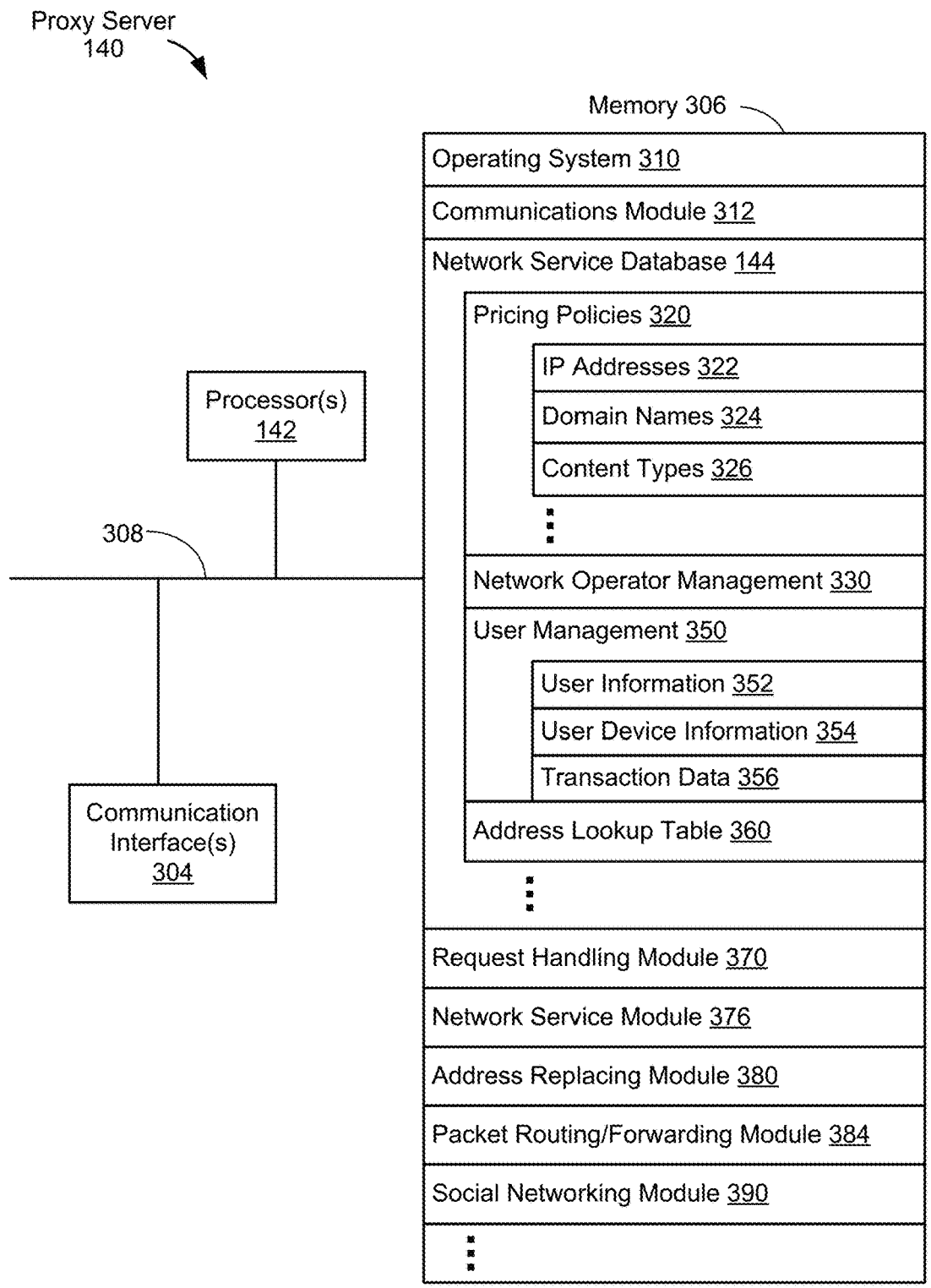
FIG. 3 is a block diagram illustrating a proxy server, in accordance with some embodiments.

FIG. 3 is a block diagram illustrating an exemplary proxy server 140 in accordance with some embodiments. The proxy server 140 includes one or more processing units (processors or cores) 142, one or more network or other communications interfaces 304, memory 306, and one or more communication buses 308 for interconnecting these components. The communication buses 308 optionally include circuitry (sometimes called a chipset) that interconnects and controls communications between system components. The proxy server 140 optionally includes a user interface (not shown). The user interface, if provided, may include a display device and optionally includes inputs such as a keyboard, mouse, trackpad, and/or input buttons. Alternatively or in addition, the display device includes a touch-sensitive surface, in which case the display is a touch-sensitive display.

Memory 306 includes high-speed random-access memory, such as DRAM, SRAM, DDR RAM, or other random-access solid-state memory devices; and may include non-volatile memory, such as one or more magnetic disk storage devices, optical disk storage devices, flash memory devices, and/or other non-volatile solid-state storage devices. Memory 306 may optionally include one or more storage devices remotely located from the processor(s) 142. Memory 306, or alternately the non-volatile memory device(s) within memory 306, includes a non-transitory computer-readable storage medium. In some embodiments, memory 306 or the computer-readable storage medium of memory 306 stores the following programs, modules and data structures, or a subset or superset thereof:

- an operating system 310 that includes procedures for handling various basic system services and for performing hardware dependent tasks;
- a network communication module 312 that is used for connecting the proxy server 140 to other computers via the one or more communication network interfaces 304 (wired or wireless) and one or more communication networks (e.g., the one or more networks 130);
- a network service database 144 for storing data associated with the network service platform, which includes:
    - pricing policies 320, including but not limited to:
        - IP addresses 322 including, but not limited to, one or more predetermined zero-rated IP addresses, specially priced IP addresses, and/or regularly priced IP addresses;
        - domain names 324 including, but not limited to, one or more predetermined zero-rated domain names, specially priced domain names, and/or regularly priced domain names; and
        - content types 326 including, but not limited to, one or more content types (e.g., texts, images, and/or videos) for retrieval by the user devices 102 with predetermined pricing policies; and
    - network operator management information 330 including network operator information such as network segment information, network type, IP addresses and/or IP address blocks hosted by a respective network operator, etc.;
    - user management information 350, including but not limited to:
        - user information 352 such as user profiles, login information, privacy and other preferences, biographical data, and the like. In some embodiments, for a given user, the user information 352 includes data associated with the user's name, profile picture, contact information, birth date, sex, marital status, family status, employment, education background, preferences, interests, and/or other demographic information;
        - user device information 354 including, but not limited to, user device type, user device MAC address, Electronic Serial Number (ESN), International Mobile Station Equipment Identity (IMEI), Mobile Equipment Identifier (MEID), and/or other type(s) of user device identifier(s); and
        - transaction data 356 including, but not limited to, payment data (such as account balance, credit card information, app credit or gift card balance, billing address, shipping address, etc.) and/or purchased items (such as a network service type, data pack, etc.); and
    - address lookup table 360 storing one or more synthesized addresses in association with one or more web servers 150 respectively, and one or more actual addresses in association with the one or more web servers 150 respectively;
- a request handling module 370 for handling and responding to requests from user devices 102, and for forwarding and routing requests or packets to corresponding web servers 150;
- a network service module 376 for providing network service (e.g., Free Basics service) with various pricing policies and related features (e.g., in conjunction with browser module 224 or application module 232 on the user device 102, FIG. 2);
- an address replacing module 380 for replacing synthesized addresses with corresponding actual addresses of respective web servers 150;
- a packet routing/forwarding module 384 for routing/forwarding data packets, including encrypted data packets, between the user devices 102 and the web servers 150 without decrypting or checking the content of the data packets; and
- a social networking module 390 for providing social-networking services and related features (e.g., in conjunction with web browser module 224 or a social network application client module on the client device 102, FIG. 2).

In some embodiments, the network service module 376 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules and applications correspond to a set of executable instructions for performing one or more functions as described above and/or in the methods described herein (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments.

Figure 4:
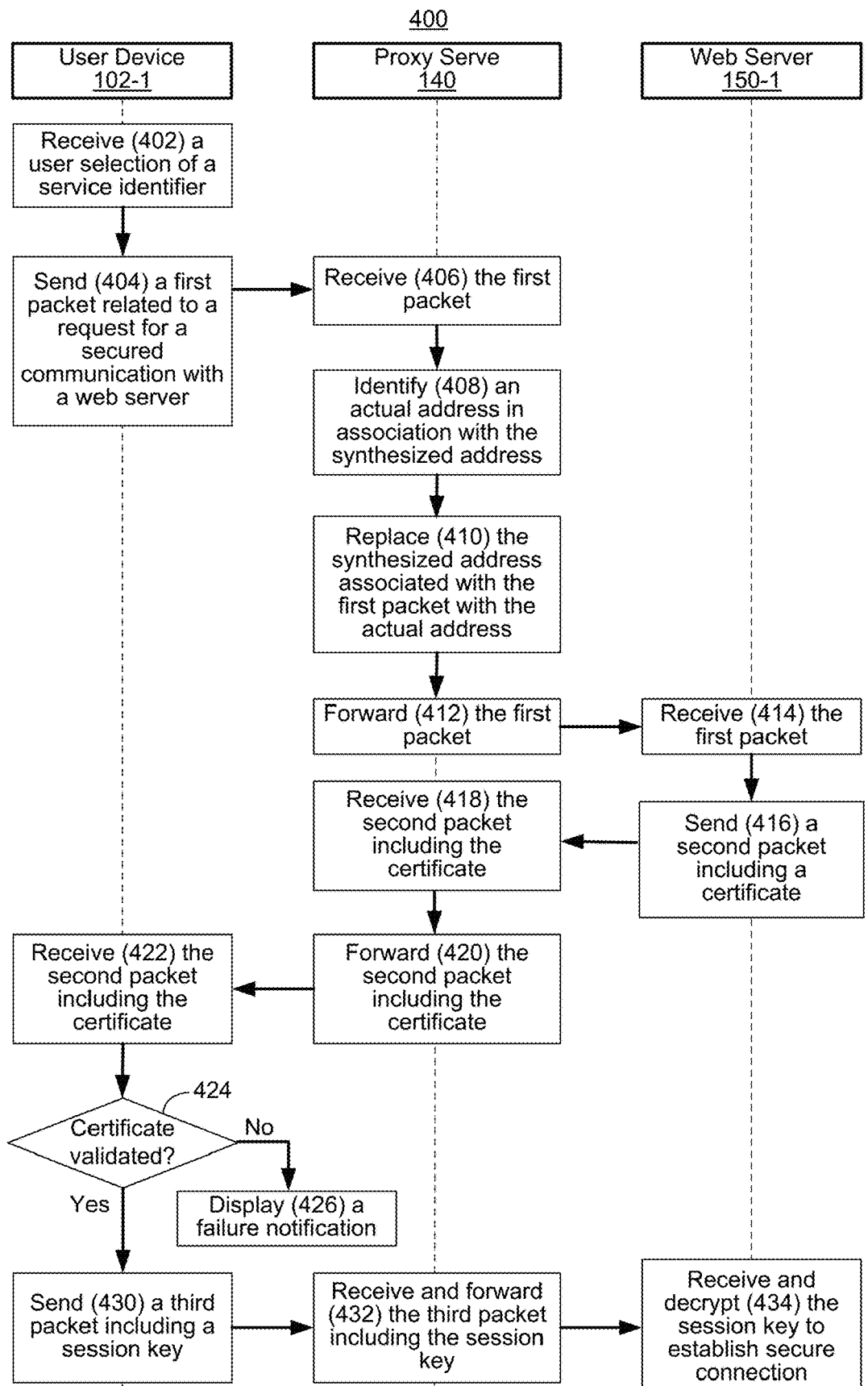
FIG. 4 is a flow diagram illustrating a method for providing secured end-to-end data communications, in accordance with some embodiments.
Figure 5:
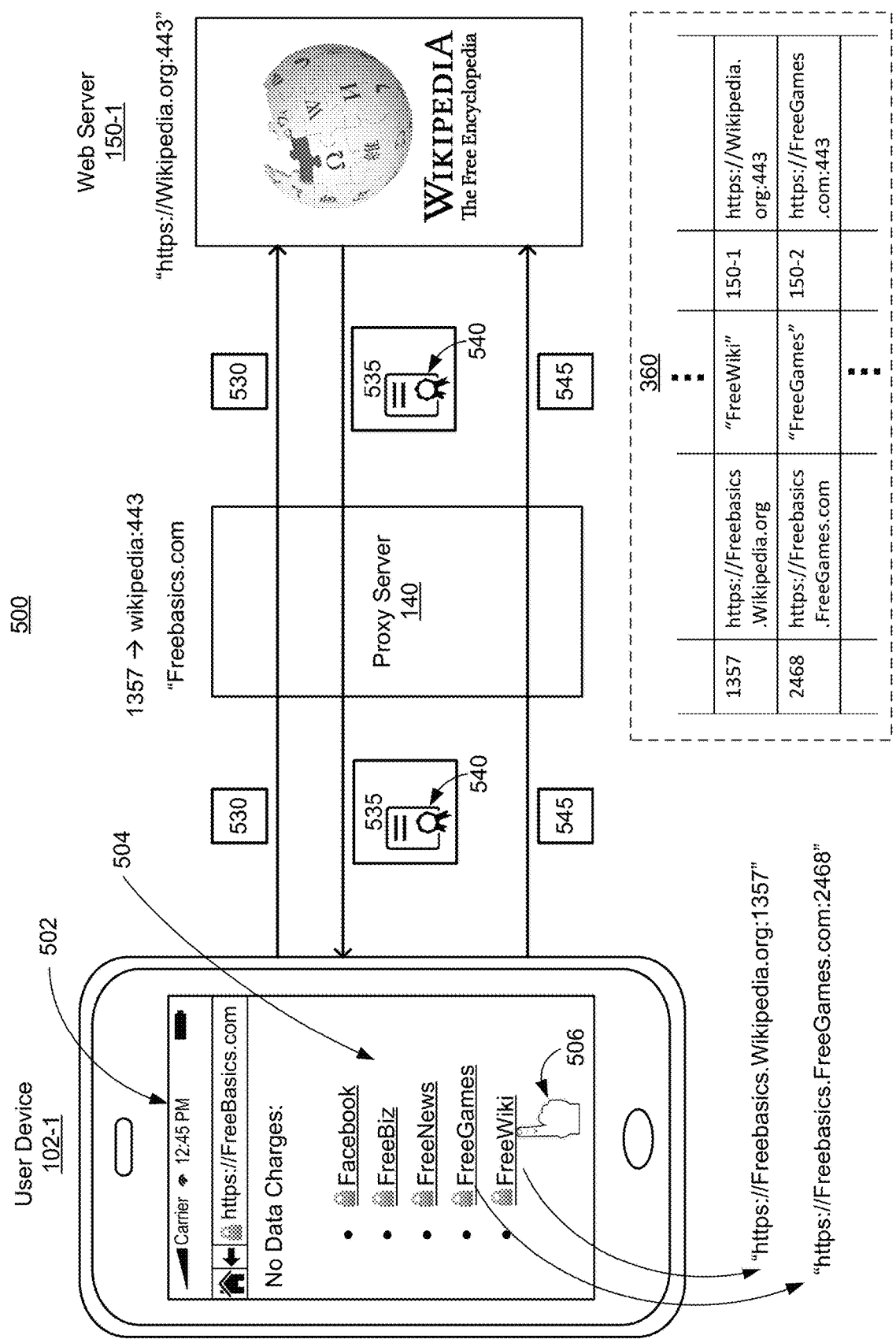
FIG. 5 is a diagram illustrating a process for providing secured data communication by a proxy server coupled between a user device and a web server, in accordance with some embodiments.

FIG. 4 is a flow diagram illustrating a method 400 for providing secured end-to-end data communications, in accordance with some embodiments. FIG. 5 is a diagram illustrating a process 500 for providing secured end-to-end data communication by the proxy server 140 coupled between an exemplary user device 102 (e.g., user device 102-1, FIG. 1) and an exemplary web server 150 (e.g., web server 150-1, FIG. 1), in accordance with some embodiments. One or more steps of method 400 and process 500 are performed by a user device 102 (e.g., user device 102-1, FIGS. 1-2), the proxy server 140 (FIGS. 1 and 3), and a web server 150 (e.g., web server 150-1, FIG. 1). The user device shown in FIGS. 4 and 5 can be any user device of the user devices 102-1 through 102-$n$ as shown in FIG. 1. The web server shown in FIGS. 4 and 5 can be any web server of the web servers 150-1 through 150-$p$ as shown in FIG. 1. One or more operations performed in method 400 and process 500 correspond to instructions stored in computer memories (e.g., memory 212, FIG. 2 and memory 306, FIG. 3) or other computer-readable storage mediums.

In some embodiments as illustrated in FIG. 5, a user accesses the Internet using the user device 102-1 (e.g., web browser module 224, FIG. 2) at zero-rating, i.e., at no data charges. For example, the user visits "https://FreeBasics.com" to view one or more zero-rated network services provided to the user. In some embodiments, the proxy server 140 is configured to host various network services provided by the domain "https://FreeBasics.com." The proxy server 140 may be a SSL-secured web server configured to provide one or more SSL-secured domain and/or SSL-secured web pages, such as "https://FreeBasics.com."

After the user submits a request to access "https://FreeBasics.com," the user device 102-1 provides a list 504 of service identifiers (e.g., tags, names, acronyms, service IDs, or resource identifiers, etc.) in association with one or more web servers 150 respectively on user interface 502 as shown in FIG. 5. In some embodiments, the one or more web servers 150 provide zero-rated content items at no data charges to the user device 102-1. The service identifiers for services include, but are not limited to, identifiers related to social networking such as "Facebook," business such as "FreeBiz," news content providers such as "FreeNews," games such as "FreeGames," and/or a free encyclopedia such as "FreeWiki." For example, web server 150-1 (FIG. 1) provides Internet service related to "FreeWiki" at no data charges to user device 102-1. Web server 150-2 (FIG. 1) provides Internet service related to "FreeGames" at no data charges to user device 102-1.

One or more web servers 150 are SSL-secured web servers configured to provide SSL-secured content to user device 102-1. For example, web server 150-1 (FIG. 1) is configured to host a SSL-secured web server with a URL of "https://wikipedia.org" corresponding to the free service "FreeWiki." Web server 150-2 (FIG. 1) is configured to host a SSL-secured web service with a URL of "https://FreeGames.com" (not shown) corresponding to the free service "FreeGames." Port number "443" is used for providing communication security over computer network under Hypertext Transfer Protocol (HTTP) over Transport Layer Security (TLS)/Transport Layer Security (TLS) protocol. Port "443" is also referred to as an actual port number for SSL-secured communicating with a web server under Transmission Control Protocol (TCP) or User Datagram Protocol (UDP) protocol.

As shown in FIG. 5, each service identifier from the list 504 of service identifiers is associated with a synthesized (e.g., arbitrarily defined) address. For example, a service identifier includes a hyperlink referenced to the synthesized address. In some embodiments, the synthesized address includes a synthesized (e.g., arbitrarily defined) identifier associated with the corresponding web server. In some embodiments, the synthesized identifier includes a synthesized (e.g., arbitrarily defined) port number. In some embodiments, the synthesized address further includes a domain name of the proxy server 140, such that a request generated from the synthesized address is directed to the proxy server 140.

In one example, the service identifier "FreeWiki" is associated with a synthesized address "https://Freebasics.Wikipedia.org:1357." The web server 150-1 hosting SSL-secured free service "FreeWiki" has an actual address of "https://Wikipedia.org:443." The actual address is an address used under Transmission Control Protocol (TCP) or User Datagram Protocol (UDP). The synthesized address for "FreeWiki" uses a synthesized port number "1357" in association with web server 150-1. Alternatively or additionally, the synthesized port number "1357" is associated with the domain "https://wikipedia.org" and/or one or more web pages hosted by such domain. The synthesized port number may be randomly generated by the proxy server 140 and assigned to the web server 150-1. In some embodiments, a synthesized port number is a 16-bit integer. The synthesized port number can range from 0 to 65535, excluding the numbers currently occupied by actual port numbers, such as "443," "21." "80," "53," and other actual port numbers currently used under Transmission Control Protocol (TCP) and User Datagram Protocol (UDP). Furthermore, the synthesized address for "FreeWiki" is used for directing requests related to "FreeWiki" to domain "https://FreeBasics.com" hosted by the proxy server 140.

In another example, the service identifier "FreeGames" is associated with a synthesized address "https://Freebasics.FreeGames.com:2468." The web server 150-2 hosting SSL-secured free service "FreeGames" has an actual address of "https://FreeGames.com:443." The synthesized port number for "FreeGames" is "2468" in association with the web server 150-2, the domain "https://FreeGames.com," and/or one or more pages hosted by such domain. Furthermore, the synthesized address for "FreeGames" is used for directing requests related to "FreeGames" to domain "https://FreeBasics.com" hosted by the proxy server 140.

As shown in FIG. 5, the proxy server 140 stores a lookup table (e.g., address lookup table 360, FIG. 3) including a plurality of synthesized addresses in association with one or more web servers 150 respectively. The lookup table 360 also stores the actual addresses of the one or more web servers 150 respectively. For example, the address lookup table 360 stores the synthesized port number "1357" in association with the web server 150-1 hosting "FreeWiki" under SSL-secured communication, which is associated with the actual address "https://Wikipedia.org:443" using the actual port number "443." The address lookup table 360 also stores the synthesized port number "2468" in association with the web server 150-2 hosting "FreeGames" under SSL-secured communication, which is associated with the actual address "https://FreeGames.com:443" using the actual port number "443." The address lookup table 360 also stores the synthesized address "https://Freebasics.Wikipedia.org:1357" and the actual address "https://Wikipedia.org:443" in association with the web server 150-1 hosting "FreeWiki." The address lookup table 360 stores the synthesized address "https://Freebasics.FreeGames.com:2468" and the actual address "https://FreeGames.com:443" in association with the web server 150-2 hosting "FreeGames." The synthesized address for a certain web server is distinct from the actual address for the corresponding web server. The synthesized port number is distinct from the actual port number for the corresponding web server.

Referring to FIG. 4, the user device 102-1 (e.g., user interface module 220, FIG. 2) receives (402) a user selection of a service identifier associated with a web server 150 from the list 504 of the service identifiers. For example as shown in FIG. 5, the user selects 506 the service identifier "FreeWiki" using a finger touch on a touch screen or a mouse click on the user interface 502. Alternatively, the user can select "FreeWiki" using a voice command function or other suitable input function(s) supported by user interface module 220 of the user device 102-1.

The user device 102-1 generates a request for accessing "FreeWiki" based on the user selection. The request is directed to the synthesized address for "FreeWiki." The user device 102-1 sends (404) a data packet 530 associated with the request to the synthesized address "https://Freebasics.Wikipedia.org:1357." The data packet 530 is sent from the user device 102-1 to the proxy server 140 that hosts "https://Freebasics.Wikipedia.org: 1357." In some examples, the data packet 530 is an IPv4 packet or an IPv6 packet under Internet Protocol Security (IPsec) protocol. The data packet 530 includes a header and payload. In some embodiments, the data packet 530 includes the synthesized address "https://Freebasics.Wikipedia.org:1357," using the synthesized port number "1357," in the header of the data packet 530. The data packet 530 is sent from the user device 102-1 to the proxy server 140 and is further forwarded to the web server 150-1 by the proxy server 140 at zero-rating.

In some embodiment, the data packet 530 is related to a request for establishing an SSL-secured connection between the web server 150-1 and the user device 102-1. In some embodiments, after a secured connection is established, the data packet 530 is encrypted for a secured communication, such as an SSL-secured communication, between the user device 102-1 and the web server 150-1. In some examples, the encrypted content is included in the payload of the data packet 530. In some examples, the data packet 530 is associated with a GET request for retrieving data, such as zero-rated content items from the web server 150-1 at zero-rating. In some other examples, the data packet 530 is associated with a POST request for submitting data, such as zero-rated content items, to the web server 150-1 at zero-rating.

The proxy server 140 (e.g., request handling module 370, FIG. 3) receives (406) the data packet 530 corresponding to the request for accessing "FreeWiki." The proxy server 140 (e.g., address replacing module 380, FIG. 3) identifies (408) the actual address of the web server 150-1 by checking the address lookup table 360 (FIGS. 3 and 5). For example, the proxy server 140 obtains the synthesized port number "1357" or the synthesized address "https://Freebasics.Wikipedia.org:1357" from the data packet 530. The proxy server 140 recognizes, by checking the lookup table 360, that the synthesized port number "1357" or the synthesized address "https://Freebasics.Wikipedia.org:1357" is associated with the web server 150-1. The proxy server 140 then identifies the actual address "https://Wikipedia.org:443" of the web server 150-1 from the address lookup table 360.

In some embodiments, the proxy server 140 (e.g., address replacing module 380, FIG. 3) replaces (410) the synthesized address in the data packet 530 with the identified actual address for the web server 150-1. For example, the proxy server 140 replaces the synthesized address "https://Freebasics.Wikipedia.org:1357" with the actual address "https://Wikipedia.org:443" identified from the lookup table 360. The proxy server 140 replaces the synthesized port number "1357" with the actual port number "443."

The proxy server 140 (e.g., packet routing/forwarding module 384, FIG. 3) forwards (412) the data packet 530 to the web server 150-1 using the actual address "https://Wikipedia.org:443." In some embodiments, the data packet 530 is forwarded from the user device 102-1 to the web server 105-1 by the proxy server 140 without the proxy server 140 checking or decrypting the encrypted content in the data packet 530. For example, the proxy server 140 forwards the data packet 530 without checking the data section, such as the encrypted content in the payload of the data packet 530.

The web server 150-1 receives (414) the data packet 530. In some embodiments, in response to a request for establishing an SSL-secured communication, the web server 150-1 sends (416) a data packet 535 to the proxy server 140. The data packet 535 includes an electronic certificate 540. In some embodiments, the electronic certificate 540 is a copy of an SSL certificate issued by a Certificate Authority (CA) to the web server 150-1. In some embodiments, the electronic certificate 540 includes a public key used for encrypting data. Data encrypted by the public key can only be decrypted by a private key associated with the public key. In some other embodiments, after the secured connection is established, the data packet 530 from the user device 102-1 may be encrypted, and the web server 150-1 may receive and decrypt the encrypted content of the data packet 530.

The proxy server receives (418) the data packet 535. In some embodiments, the data packet 535 includes the electronic certificate 540. The proxy server (e.g., packet routing/forwarding module 384, FIG. 3) further forwards (420) the data packet 535 to the user device 102-1. As such, the data packet 535 is forwarded from the web server 150-1 to the user device 102-1 by the proxy server 140. The proxy server 140 forwards the data packet 535 without checking the content in the payload of the data packet 535. For example, the proxy server 140 does not check the electronic certificate 540 included in the data packet 535.

In some embodiments, after an SSL-secured connection is established between the web server 150-1 and the user device 102-1, the data packet 535 sent from the web server 150-1 is encrypted. The proxy server 140 forwards the encrypted data packet 535 without checking or decrypting the encrypted content in the payload.

In some embodiments, the data packet 535 returned from the web server 150-1 includes the actual address of the web server 150-1, e.g., "https://Wikipedia.org:443." In some embodiments, the proxy server 140 identifies the synthesized address "https://FreeBasics.Wikipedia.org:1357" associated with the web server 150-1 from the address lookup table 360. In some embodiments, the proxy server 140 replaces the actual address of the web server 150-1 with the synthesized address associated with the web server 150-1. The proxy server 140 forwards the data packet 535 to the user device 102-1. In some alternative embodiments, the proxy server 140 forwards the data packet 535 to the user device 102-1 without identifying synthesized address and/or replacing the actual address with the synthesized address.

The user device 102-1 receives (422) the data packet 535 from the proxy server 140. In some embodiments, the data packet 535 includes the electronic certificate 540. The user device 102-1 (e.g., certificate validation module 228, FIG. 2) determines (424) whether the electronic certificate 540 is valid. For example, the user device 102-1 (e.g., certificate validation module 228, FIG. 2) checks whether the electronic certificate 540 is issued by a trusted certificate issuer listed in the trusted certificate issuer list 254 (FIG. 2). In some embodiments, the user device 102-1 also stores a security list of a plurality of web servers that provide secured communications to the user device and/or a security list of a plurality of security certificates associated with such web servers respectively. In some embodiments, the user device 102-1 (e.g., certificate validation module 228, FIG. 2) checks a certificate root of an electronic certificate against the list of trusted Certificate Authorities (CAs) for issuing electronic certificates to web servers. The user device 102-1 (e.g., certificate validation module 228, FIG. 2) also checks whether the electronic certificate is unexpired, unrevoked, and whether its common name is valid for the requested web page.

In some embodiments, in accordance with a determination that the electronic certificate 540 is not valid, (424— No), the user device 102-1 displays (426) a notification on the user device 102-1 to notify the user of the failure of establishing an SSL-secured connection with the web server 150-1. In some embodiments, the user device 102-1 may send a notification to the proxy server 140 regarding such security validation failure. The proxy server 140 receives the notification from the user device 102-1. The proxy server 140 may further contact the web server 150-1 regarding such issue.

In accordance with a determination that the electronic certificate 540 is valid (424—Yes), for example, the electronic certificate 540 is issued by a trusted certificate issuer and the electronic certificate 540 is unexpired and unrevoked, the user device 102-1 sends (430) a data packet 545 to the proxy server 140. In some embodiments, the user device 102-1 (e.g., the session key generation module 229, FIG. 2) generates a session key based on the public key included in the electronic certificate 540 received from the web server 150-1. The data packet 545 includes the session key. In some embodiments, the user device 102-1 encrypts the data packet 545 using the public key.

The proxy server 140 receives and forwards (432) the data packet 545 including the session key. The data packet 545 may be encrypted using the public key of the web server 150-1. The proxy server 140 forwards the data packet 545 from the user device 102-1 to the web server 150-1 without checking or decrypting the data packet 545.

The web server 150-1 receives the encrypted data packet 545 from the proxy server 140. The web server 150-1 decrypts (434) the session key using its private key corresponding to the public key. In some embodiments, the web server 150-1 sends an acknowledgement encrypted with the session key to start the encrypted session to the proxy server 140. The proxy server 140 receives and forwards such acknowledgement to the user device 102-1. This acknowledgement indicates an establishment of a SSL-secured connection between the web server 150-1 and the user device 102-1.

In some embodiments, after the SSL-secured connection is established, the web server 150-1 and the user device 102-1 encrypt all data packets transmitted between the web server 150-1 and the user device 102-1 with the session key. Only the web server 150-1 and the user device 102-1 can decrypt the encrypted data packets within the established SSL-secured connection. The proxy server 140 transmits/ forwards/routes encrypted data packets between the user device 102-1 and the web server 150-1 without checking, decrypting, or attempting to decrypt the encrypted content, such as the payload, of the data packets. As discussed in the present disclosure, the proxy server 140 functions as a tunnel providing secured connection between the user device 102-1 and the web server 150-1. In particular, the proxy server 140 uses the synthesized address to identify the actual address, the proxy server 140 then forwards the encrypted data packets to the actual address. Such secured communication can be used for securely exchanging confidential information, such as financial data, biometric data, user passwords, personally identifiable information (PII) data, and/or other types of confidential data, between the user device 102-1 and the web server 150-1.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:

at a proxy server having one or more processors and memory storing instructions for execution by the one or more processors, wherein the proxy server is coupled to a user device and a plurality of web servers:

receiving, from the user device, a request directed to the proxy server for accessing a first web server of the plurality of web servers and a first data packet directed to the first web server, the first data packet including a first synthesized address previously system-generated by the proxy server, wherein:

the first synthesized address is associated with the first web server; and the first synthesized address includes a domain name of the proxy server;

looking up the first synthesized address in a lookup table stored at a database of the proxy server to identify a first actual address of the first web server;

replacing the first synthesized address in the first data packet with the first actual address of the first web server; and forwarding the first data packet to the first web server using the first actual address of the first web server.

2. The method of claim 1, wherein the first synthesized address comprises a first synthesized identifier associated with the first web server.

3. The method of claim 2, wherein the first actual address comprises an actual port number used for communicating with the first web server.

4. The method of claim 1, wherein the request is for a secure connection between the user device and the first web server.

5. The method of claim 4, wherein the first data packet is forwarded from the user device to the first web server by the proxy server without the proxy server checking a payload of the first data packet.

6. The method of claim 1, wherein the request is for zero-rated content items from the first web server and the first data packet is encrypted.

7. The method of claim 1, wherein the first data packet from the user device is associated with submitting data to the first web server at zero-rating, and wherein the first data packet is encrypted.

8. The method of claim 1, further comprising:
in response to forwarding the first data packet to the first web server, receiving a second data packet from the first web server, wherein the second data packet includes a security certificate associated with the first web server; and
forwarding the second data packet to the user device.

9. The method of claim 8, wherein the second data packet is forwarded from the first web server to the user device by the proxy server without the proxy server checking the security certificate of the second data packet.

10. The method of claim 8, wherein the second data packet comprises the first actual address of the first web server, and wherein the method further comprises:
replacing the first actual address with the first synthesized address associated with the first web server.

11. The method of claim 8, further comprising:
receiving, from the user device, a second request to access the first web server and a third data packet including a session key generated from the security certificate; and
forwarding, to the first web server, the received third packet.

12. The method of claim 1, wherein the first synthesized address includes at least a portion of a domain name of the web server.

13. A non-transitory computer-readable storage medium storing one or more programs configured for execution by one or more processors of a proxy server coupled to a user device and a plurality of web servers, the one or more programs including instructions for:
receiving, from the user device, a request directed to the proxy server for accessing a first web server of the plurality of web servers and a first data packet directed to the first web server, the first data packet including a first synthesized address previously system-generated by the proxy server, wherein:
the first synthesized address is associated with the first web server; and
the first synthesized address includes a domain name of the proxy server;
looking up the first synthesized address in a lookup table to identify a first actual address of the first web server;
replacing the first synthesized address in the first data packet with the first actual address of the first web server; and
forwarding the first data packet to the first web server using the first actual address of the first web server.

* * * * *